Patented Mar. 4, 1952

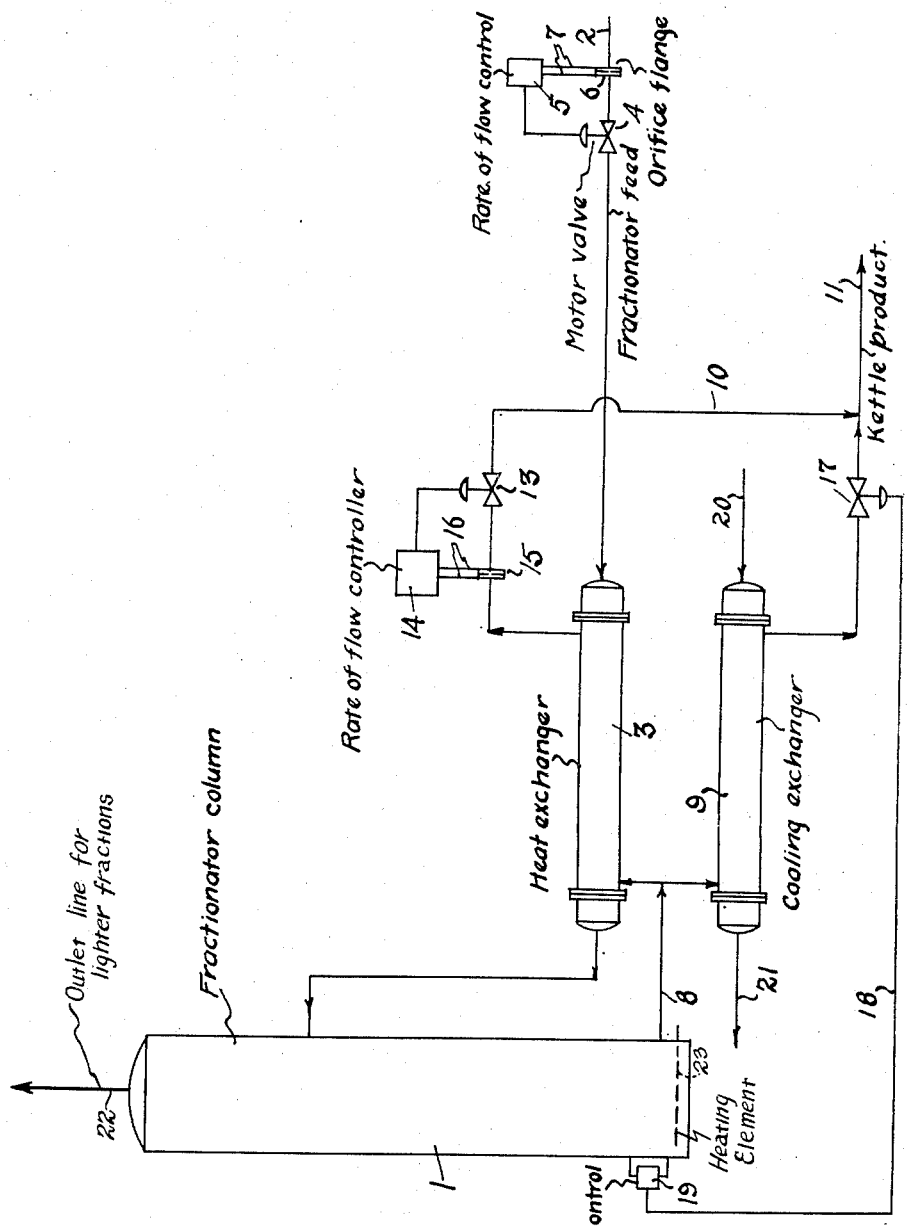

2,588,305

UNITED STATES PATENT OFFICE 2,588,305

PROCESS FOR DISTILLING HYDROCARBONS

Henry Earl Sullenger, Phillips, Tex., assignor to Phillips Petroleum Company, a corporation of Delaware Continuation of application Serial No. 550,208, August 19, 1944. This application May 7, 1948, Serial No. 25,557

1 Claim. (Cl. 196—71)

This invention relates to a new and novel method and apparatus for effecting economical heat exchange in the operation of fractionating and similar equipment.

A prime object of this invention is to provide a method of and apparatus for economically recovering the available heat in the liquid kettle of a fractionating column, as for example a gasoline fractionating column, for the purpose of maintaining a constant feed temperature of the feed to the fractionating column while maintaining a substantially constant liquid level in the fractionator kettle.

Among the important advantages of this invention are (1) a closer and more accurate control of the temperature of the feed to the column; (2) a more economical utilization of the available heat in the liquid kettle product of the column, and (3) the maintenance of a uniform liquid level in the fractionator kettle.

This application is a continuation of my copending application Serial No. 550,208, filed August 19, 1944 and now abandoned, for heat exchange method and apparatus.

The apparatus of this invention involves a novel combination of known equipment of elements by means of which the feed to a fractionating column or the like may be preheated by the economic recovery of heat from the liquid in the column kettle while at the same maintaining a substantially constant liquid level in the kettle. By means of the combination of this invention a major portion of the liquid product from the kettle is withdrawn at a uniform rate and caused to exchange its heat through a conducting wall with the feed to the fractionating column which is supplied thereto at a substantially uniform rate for the purpose of preheating it. The remainder of the fractionator kettle product is passed through a second heat exchanger and caused to give up its heat to cooling water or other cooling medium foreign to the primary operation. The rate of flow of the kettle product through the second heat exchanger or cooler is controlled by a liquid level controller on the fractionator kettle. In operating this combination the rate of flow for the major portion of the fractionator kettle product, as for example ninety percent thereof, is predetermined, and this portion of the product is passed through the heat exchanger for the purpose of preheating the fractionator feed. The remaining portion of the kettle product, as for example the remaining ten percent thereof, is passed intermittently and at an irregular rate depending upon variations in the kettle liquid level, through the second heat exchanger before passing it to storage or other use.

An important advantage of this system over the conventional practice of putting all the kettle product through the heat exchanger resides in the fact that variations in kettle liquid level do not produce variations in the feed temperature. The overall result therefore is that the temperature of the feed to the column is maintained substantially at a constant predetermined value, economically recovering the major portion of the useful heat in the kettle product.

Other and more detailed objects of the invention will be apparent from the following disclosure of a useful embodiment thereof.

This invention resides substantially in the combination, construction, arrangement, relative location of parts, steps and series of steps, all as will be described in detail below.

In the accompanying drawings the single figure is a diagrammatic and schematic illustration of the apparatus combination of this invention.

The feed through the line 2 to the fractionating column or other equivalent equipment 1 is passed through a heat exchanger 3 of any suitable conventional form, at a predetermined rate under the control of the pressure fluid operated valve 4. A heating element 23 for the fractionating column 1 is diagrammatically shown. The operation of this valve is controlled by a rate of flow controller 5, which is responsive to pressure changes occurring across an orifice plate or disc 6 rendered effective through the pipe connections 7 to the controller 5 from the line 2 on opposite sides of the orifice disc.

The kettle product is transferred through the line 8 in two branches, one passing to the heat exchanger 3 and the other passing to a second heat exchanger 9, which will be called the cooling heat exchanger. The portion of the kettle product flowing through the heat exchanger 3 passes through the line 10 to a line 11 which conducts the cool kettle product to storage or other use. In the line 10 is a pressure fluid operated valve 13 which is controlled by the rate of flow controller 14 similar to that previously described by means of an orifice plate or disc 15 and the pipe connections 16. The other and minor portion of the kettle product passes through the other branch and the cooling heat exchanger 9 into line 11. Cooling water for the exchanger 9 is delivered thereto through the line 20 and delivered therefrom by the line 21 to waste or any available use. The flow of kettle product through the exchanger 9 is controlled by a pressure fluid operated valve 17 in the line, the operation of which is under the control of a liquid level controller 19 on the fractionator kettle through the pipe connection 18.

These various control elements, including the rate of flow devices 5 and 14, the pressure fluid operated valves 4, 13 and 17, and the liquid level controller 19, are all devices well known in the art and available in a number of suitable forms. The conventional outlet 22 from the fractionator column permits removal of lighter fractions. For this reason no further and more detailed description thereof is desirable, except to note that the rate of flow devices 5 and 14, and the liquid level controller 19 are primarily devices for controlling the supply of pressure fluid, frequently compressed air, to the pressure fluid operated valves to adjust the flow through these valves in accordance with predetermined conditions.

In the operation of this device the controller 5 is set to supply the fluid to be fractionated to the fractionator through the line 2 at a predetermined substantially constant rate. The rate of flow controller 14 is likewise set as conditions require for the most economical and effective operation, so that a desired predetermined portion of the kettle product flows through the line 8, heat exchanger 3 and line 10. Thus the most economical recovery of heat from this product is effected by transfer to the fractionator feed. The remaining portion of the kettle product is passed through the heat exchanger 9 to the line 11 under the control of the liquid level device 19 and the valve 17. The liquid level device 19 is set so as to maintain a predetermined liquid level in the kettle and the excess of the kettle product, above a predetermined amount as determined by the predetermined liquid level after the withdrawal of the major portion of the heat exchanger 3, is intermittently passed through the cooling heat exchanger 9.

It will be at once apparent by reason of this method of operation that a very uniform and constant rate of heat transfer to the fractionator feed can be obtained since fluctuations in the liquid level of the kettle product have no influence upon the proportion of the kettle product used to preheat fractionator feed.

Those skilled in the art will at once appreciate the subject matter of this invention in both the apparatus and the method is subject to some variation without departure from the novel subject matter herein disclosed. I do not, therefore, desire to be strictly limited to the disclosure but rather by the scope of the claim granted me.

What is claimed is:

In a process for distilling a multicomponent hydrocarbon mixture which comprises separating a liquid feed stock thereof into a high boiling fraction and a low boiling fraction, the improvement comprising injecting said feed stock at a substantially uniform rate of flow and at a substantially uniform temperature level into a fractionating zone, withdrawing a major fractional portion of the higher boiling product appearing as residue in said zone at a substantially uniform rate, subjecting said portion of high boiling liquid product to indirect heat exchange with said liquid feed stock, withdrawing the remaining fractional portion of high boiling residue from the bottom of said fractionating zone at a variable rate in response to the level of accumulated residue in the lower section of said fractionating zone to maintain the level of accumulated residue in said zone substantially constant, and combining as a residual product the two fractions of residue thus separately withdrawn from the base of the distillation zone.

HENRY EARL SULLENGER.

REFERENCES CITED

The following references are of record in the file of this patent:

UNITED STATES PATENTS

| Number | Name | Date |
|---|---|---|
| 1,871,114 | Cooke et al. | Aug. 9, 1932 |
| 2,000,186 | Murphy | May 7, 1935 |
| 2,328,829 | Maschwitz et al. | Sept. 7, 1943 |